United States Patent [19]
Knutsson et al.

[11] Patent Number: 6,128,506
[45] Date of Patent: Oct. 3, 2000

[54] INTEGRATED POWER CONTROL AND CONGESTION CONTROL IN A COMMUNICATION SYSTEM

[75] Inventors: Jens Knutsson, Djursholm; Magnus Persson, Sollentuna, both of Sweden

[73] Assignee: Telefonaktiebolaget LM Ericsson, Stockholm, Sweden

[21] Appl. No.: 08/937,018

[22] Filed: Sep. 24, 1997

[51] Int. Cl.⁷ .................................................. H04B 7/005
[52] U.S. Cl. ........................ 455/522; 455/453; 370/333
[58] Field of Search .................................. 455/504, 505, 455/522, 69, 67.1, 67.3, 13.4, 453, 442; 370/318, 278, 333; 375/296, 297, 219

[56] References Cited

U.S. PATENT DOCUMENTS

| | | | |
|---|---|---|---|
| 4,965,789 | 10/1990 | Bottau et al. | 370/465 |
| 5,241,690 | 8/1993 | Larsson et al. | 455/522 |
| 5,245,629 | 9/1993 | Hall | 375/200 |
| 5,345,598 | 9/1994 | Dent | 455/522 |
| 5,469,471 | 11/1995 | Wheatley, III | 370/335 |
| 5,475,861 | 12/1995 | Hall | 455/422 |
| 5,574,982 | 11/1996 | Almgren et al. | 455/69 |
| 5,590,409 | 12/1996 | Sawahashi et al. | 455/69 |
| 5,839,056 | 11/1998 | Hakkinen | 455/69 |
| 5,867,789 | 2/1999 | Olds et al. | 455/453 |
| 5,878,350 | 3/1999 | Nakamura et al. | 455/442 |

FOREIGN PATENT DOCUMENTS

| | | | |
|---|---|---|---|
| 713 300 A1 | 5/1996 | European Pat. Off. | H04B 7/005 |
| 762 668 A2 | 3/1997 | European Pat. Off. | H04B 7/005 |

OTHER PUBLICATIONS

Search Report dated Jun. 2, 1998.
M. Andersin, "Power Control and Admission Control in Cellular Radio Systems", Ph.D. thesis, Royal Institute of Technology, Stockholm, Sweden, May 1996, pp. 1–195.

Primary Examiner—Fan Tsang
Assistant Examiner—Isaak R. Jama
Attorney, Agent, or Firm—Burns, Doane, Swecker & Mathis, L.L.P.

[57] ABSTRACT

A method of stabilizing a communication system having base stations and mobile stations using integrated control of both signal transmission power levels and signal congestion levels. In particular, the method includes measuring a quality such as a signal to interference ratio of a signal transmitted from a mobile station to a base station and measuring a total received signal power at the base station. The signal transmission power of the mobile station is changed based on comparisons of the measured signals with predetermined threshold values. When the measured total received signal power at the base station exceeds the corresponding predetermined threshold value, a congestion control algorithm is executed to reduce the signal congestion level.

8 Claims, 4 Drawing Sheets

INTEGRATED POWER CONTROL AND CONGESTION CONTROL IN A COMMUNICATION SYSTEM

BACKGROUND OF THE INVENTION

This invention relates to the control of power and traffic levels of transmitted signals in telecommunication systems, in particular spread spectrum, or code division multiple access (CDMA) systems.

In a typical CDMA system, an information data stream to be transmitted is impressed upon a much-higher-bit-rate data stream produced by a pseudo-random code generator, such that each information signal is allocated a unique code. A plurality of coded information signals are transmitted as modulations of radio frequency carrier waves and are jointly received as a composite signal at a receiver. Each of the coded signals overlaps all of the other coded signals, as well as noise-related signals, in both frequency and time. By correlating the composite signal with one of the unique codes, the corresponding information signal can be isolated and decoded.

In a mobile radiotelephone system, interference between different call connections using the same radio channel can be reduced by regulating the transmission power levels of mobile stations and base stations in the system. Preferably, only the transmission power necessary to maintain satisfactory call quality is used to reduce the likelihood of interference between calls using the same radio channel. An attribute such as a signal-to-noise interference ratio (SIR) can be used as a measure of quality or power of received signals in the system, i.e., as one measure of call quality in the system. The each connection between a mobile station and a base station can have a SIR, and SIR measures of different connections can be different.

By regulating power in communication systems that use CDMA so that only the transmission power necessary to maintain satisfactory call quality is used, capacity of the system can be increased by approximately 70% as compared with an unregulated system where signal transmission power is unnecessarily large, assuming that all of the calls or connections have the same SIR target or required SIR. In addition, mobile stations in the system consume less energy when transmit power levels are maintained at a lowest possible level. Accordingly, batteries used to power mobile stations can have a smaller capacity, allowing the mobile stations to be lighter in weight and smaller in size.

One known type of power control is so-called "fast" SIR-based control. The basic principle of fast SIR-based control of signal transmission power is that under normal conditions, an increase in signal transmission power will cause a corresponding increase in SIR. In fast SIR-based control, when the SIR of the signal transmission is higher than necessary, the signal transmission power is decreased. When a SIR of a signal transmission from a mobile station to a base station is too low, the signal transmission power of the mobile station is increased. Precise details regarding fast-SIR based control of signal transmission power in CDMA systems will be apparent to those skilled in the art, and are not discussed in this document.

When a mobile communication system is overloaded, signal transmissions within the system can mutually interfere. In such a scenario, increasing signal transmission power does not effectively increase the SIR because of "party effects".

The party effect phenomenon is similar to what happens at a party when people talking with each other speak loudly to hear over others who are speaking loudly, thus causing the overall noise level to become large. Specifically, in a system employing fast SIR-based control of signal transmission power, a first mobile station experiencing a SIR that is below a SIR target value or threshold will increase signal transmission power to bring the SIR to the target value. If the interference that the first mobile station is trying to overcome is caused by signal transmissions from a second mobile station, and signal transmissions from the first and second mobile stations are mutually interfering, then the signal transmission power increase by the first mobile station can cause a corresponding increase in interference with the second mobile station's signal transmission and degrade the second mobile station's SIR below its target value. In response the second mobile station will increase its signal transmission power to increase its SIR, thus exacerbating the original problem. Positive feedback is present in the system, and the mobile stations will each increase signal transmission power until maximum power levels are reached, without achieving the desired quality or power of the received signals. Party effects arising in one cell of the system can spread to neighboring cells in the system when, for example, high signal transmission power levels in the one cell interfere excessively with signal transmissions in an adjacent cell.

U.S. Pat. No. 5,574,982 to Almgren et al ("Almgren") provides a solution to avoid party effects in cellular radio communication systems. Almgren is incorporated by reference into this document. Almgren describes monotonically reducing a target carrier-to-interference ratio (C/I) or SIR as signal transmission power is increased. Thus, as signal power is increased to compensate for interference, the allowable level of interference is also increased. In effect, the system avoids the large reduction in signal quality of all users in the same cell that would result from party effects by tolerating a smaller reduction in signal quality, i.e., by increasing the allowable level of signal interference. However, although party effects are avoided, signal quality is nevertheless reduced.

Problems can arise, however, in a system having a slow, quality-based power control in addition to a fast, closed loop SIR-based power control that uses the method described in Almgren. In such a system, when an experienced signal quality (typically, a frame error rate) decreases below an acceptable value, e.g., when the system is overloaded, the slow power control will increase the SIR target by increasing the value of a specified SIR threshold. In contrast, the fast, SIR-based power control will effectively decrease the SIR target as signal power is increased to remedy the reduction in signal quality. Thus, the system suffers from the disadvantage that the slow power control and the fast power control can counteract each other because they both alter the SIR target in different directions. Consequently, the fast power control can only temporarily stabilize the system.

M. Andersin, in "Power Control and Admission Control in Cellular Radio Systems", Ph.D. thesis, Royal Institute of Technology, Stockholm, Sweden, May 1996, describes a system wherein control of signal transmission power is integrated with removal of signal connections. The integration is achieved by performing fast, closed loop SIR-based control of signal transmission power only for supported signal connections, and deactivating all other (i.e., unsupported) signal connections by setting their respective signal transmission powers to zero. A supported signal connection is a signal connection whose SIR target can be achieved within the system. In contrast, an unsupported signal connection is a signal connection whose SIR target cannot be achieved within the system. Connection removal algorithms are used to select specific connections which can be removed to stabilize the system.

In other words, the SIR-based power control algorithm is not altered based on signal traffic congestion levels within the system. Instead, the set of signal connections controlled by the SIR-based power control algorithm is altered. The connection removal algorithm removes signal connections until remaining signal connections can each achieve their SIR targets under the control of the SIR-based power control algorithm. Such an integrated control will cause a communications system to a) require additional signaling over the air interface, since knowledge of the output power of the mobile stations is needed; b) require more complex infrastructure for the mobile stations and the base stations since the fast closed loop power control cannot be applied when deactivating some connections; and c) be unable to protect real time services in the deactivation phase.

SUMMARY OF THE INVENTION

The invention overcomes disadvantages of the foregoing techniques by providing integrated control of both signal transmission power and signal traffic congestion, e.g., data transfer rate, in a CDMA communications system. In a CDMA communications system wherein some users might not require real-time communication, the signal transmission power is controlled based on a) a measured signal quality, such as SIR, and b) a level of signal traffic congestion within the system. A total signal power received at a base station in the system can provide a measure of signal traffic congestion. Congestion control can be performed, for example, based on the total signal power received at the base station. Congestion control can include reducing signal traffic congestion from a first level to a second level by lowering the transmission bit rate for those users that do not require real-time communication, performing an interfrequency handover, or terminating communications between at least one mobile station and the base station.

BRIEF DESCRIPTION OF THE DRAWINGS

The features and objects of the invention will be understood by reading this description in conjunction with the drawings, in which.

DETAILED DESCRIPTION

Figure 1:
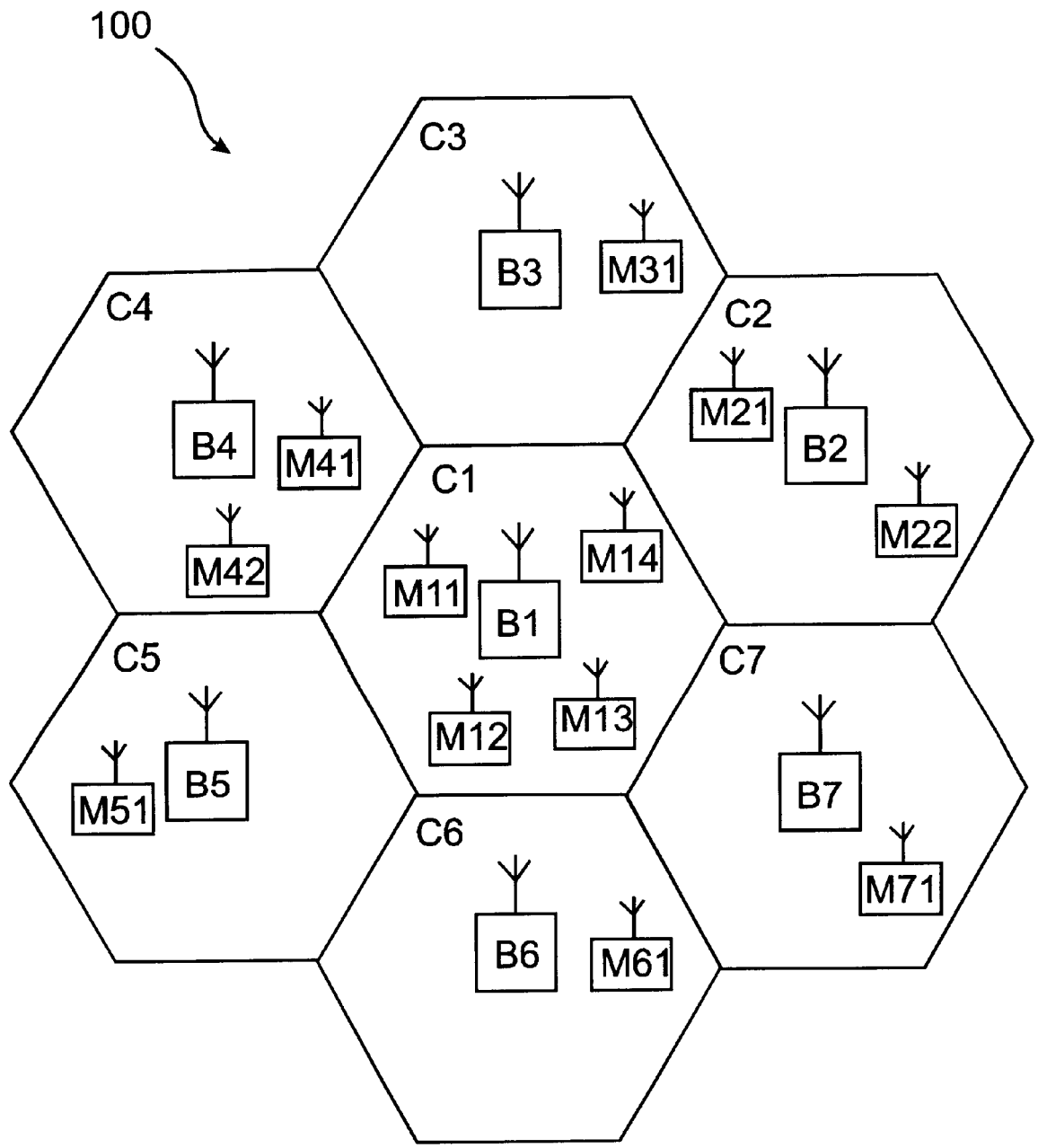
FIG. 1 is a block diagram of a CDMA communication system according to an embodiment of the invention.
Figure 2:
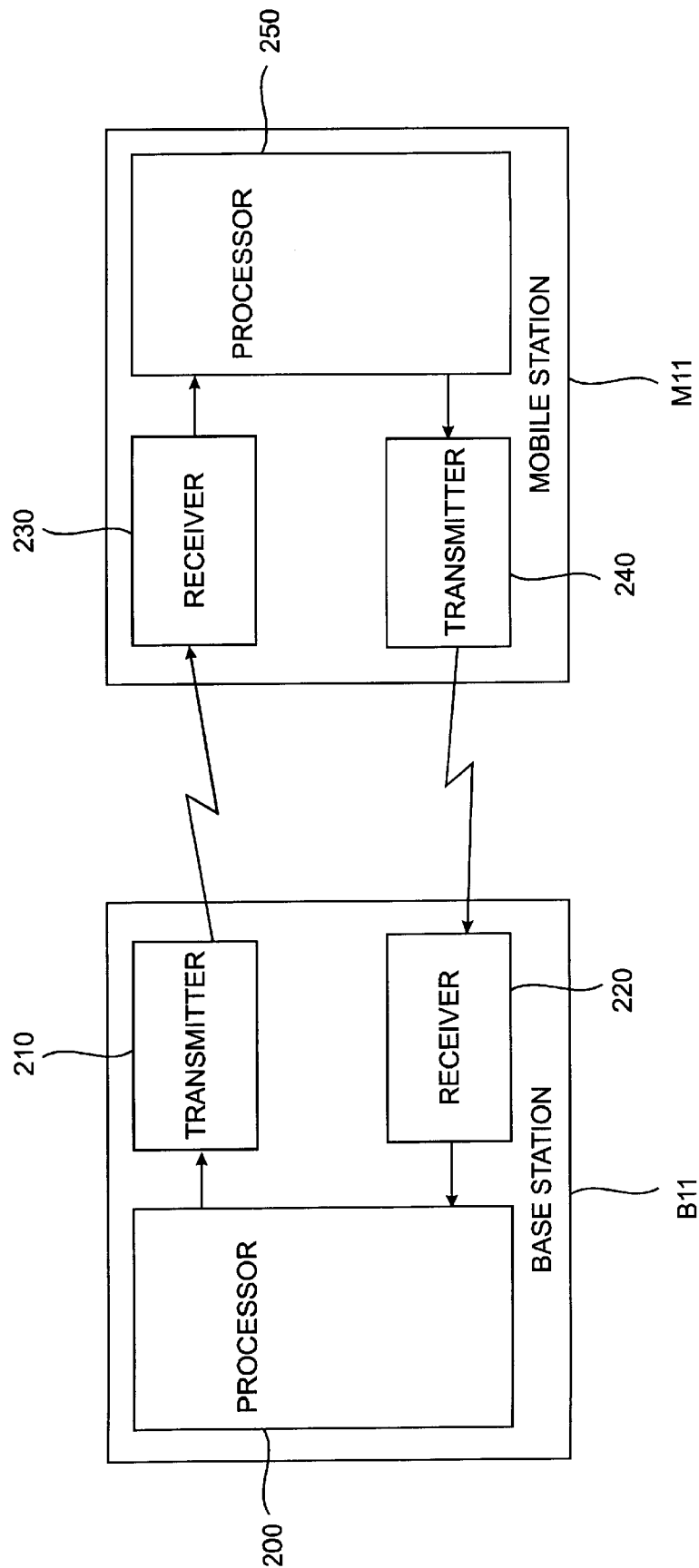
FIG. 2 illustrates internal configurations of a base station and a mobile station shown in FIG. 1.

FIG. 1 shows a CDMA communications system having cells C1–C7, wherein each cell includes one of the base stations B1–B7 and one or more of the mobile stations M11–M71. The base stations and mobile stations can have an internal configuration as shown in FIG. 2, where the base station B1 and the mobile station M11 each have a processor 200, 250, a transmitter 210, 240 and a receiver 220, 230 respectively.

According to an aspect of the invention, when a cell in the system enters an unstable or overloaded state, for example when signal transmission power levels become too high and/or SIR levels become too low, a power control algorithm avoids party effects by simultaneously lowering signal transmission quality targets or thresholds and adjusting signal transmission power, thus stabilizing the power vector, i.e., stabilizing signal transmission power levels within the system. Congestion control is also activated to reduce a level of signal traffic by either delaying, transferring to another frequency, or terminating a user's communications. The congestion can be controlled while the power control algorithm is stabilizing the power vector, or after the power vector has been stabilized. Thus, the power control algorithm stabilizes the power vector, and the congestion control reduces the signal traffic in the cell until the system is back in a stable state and the transmission quality targets or thresholds are restored to acceptable levels. Suitable processors located in base stations and/or mobile stations of the system can perform the power and congestion control functions.

Congestion can be reduced from a first level to a second level by selecting a signal transmission between a mobile station and a mobile station within the cell, and then lowering the bit transmission rate of the signal transmission. Alternatively, an interfrequency handover can be performed to shift the selected signal transmission to a different frequency to reduce congestion on the original frequency, or the selected signal transmission can be terminated. According to an embodiment of the invention, lowering the bit transmission rate is preferable to shifting the selected signal transmission to a different frequency, which is in turn preferable to terminating the signal transmission.

Situations where the bit rate is not lowered can include, for example, the situation where the bit rate is already at a minimum rate specified either by the system, or by user requirements (e.g., when the data carried by the signal transmission represent a real time voice communication between people and lowering the bit rate would unacceptably hinder the communication). If the bit rate is not lowered or if lowering the bit rate does not sufficiently reduce congestion, then frequency handover or termination can be considered.

If other signal frequencies are also congested or otherwise unavailable, then it may not be possible to change the frequency of the selected signal transmission. In that situation, the signal transmission can be terminated in order to reduce congestion.

Signal transmissions can be selected for bit rate reduction, frequency handover, or termination based on a variety of factors, including: a) whether real-time delivery of data via a particular signal transmission is required or desired, b) current transmission bit rates of various signals, c) the priority of a particular signal transmission over other signal transmissions, d) availability of other frequency channels, and e) relative contribution to congestion by a particular signal transmission. As those of ordinary skill in the art will recognize, suitable processors located in base stations and/or mobile stations of the system can be used to make these determinations and perform congestion control. Further details regarding techniques for reducing congestion will also be apparent to those of ordinary skill in the art, and are not described in this document.

When the power control algorithm is properly chosen, party effects can be confined to a particular cell, which means that sources of instability can easily be found and taken care of. In addition, if the power vector is stable when the congestion control alters one user's communications within the cell, then a resulting change in congestion can be rapidly detected and communications of other users within the cell are less likely to be altered or disrupted by the congestion control.

According to an exemplary embodiment of the invention, signal transmission power of a mobile station is increased when the following condition is true:

$$(SIR_m/SIR^t)*((P_r/P^t)^n)<1$$

where $SIR_m$ is a SIR measured, e.g., by the base station, $SIR^t$ is a specified SIR threshold, $P_r$ is a total power received at the base station, Pt is a chosen threshold, and n is a chosen coefficient. When the condition is false, signal power of the mobile station is decreased. Those skilled in the art will recognize that the threshold for total received power at the base station, $P^t$, can be chosen for a particular system by testing the system with different values of $P^t$, and then selecting a value that yields satisfactory performance. Those skilled in the art will also note that when n=0, the algorithm describes ordinary SIR-based fast power control. When n is greater than zero, the algorithm effectively reduces the SIR target as signal transmission power increases. In an embodiment of the invention, values for n are chosen based on a comparison between $P_r$ and $P^t$. When $P_r$ is less than the threshold value $P^t$, n is chosen to be 0. When the total stignal power $P_r$ received at the base station exceeds the threshold value $P^t$, n is set to a value greater than zero, for example between about 0.2 and about 0.3, thus effectively lowering the target SIR as signal transmission power of a mobile station is increased. In addition, congestion control is activated when $P_r$ exceeds the threshold value $P^t$. The congestion control forces the system back into a stable state where Pr does not exceed $P^t$. The fast power control only alters the SIR target during a very short amount of time in which the fast power control and the congestion control stabilize the system.

This technique is particularly advantageous in a system using a slow, quality-based power control in addition to a fast, SIR-based power control such as that described in Almgren. This is because according to the invention, the SIR target is altered for only a relatively short time, which is too short for the slow power control to react and attempt to increase the experienced signal quality by increasing the SIR threshold, $SIR^t$. Quality measurements in the quality-based power control can also be disregarded during a short period of time when n is greater than zero. Thus, in the invention fast power control and slow power control work together and not at cross-purposes.

Figure 3:
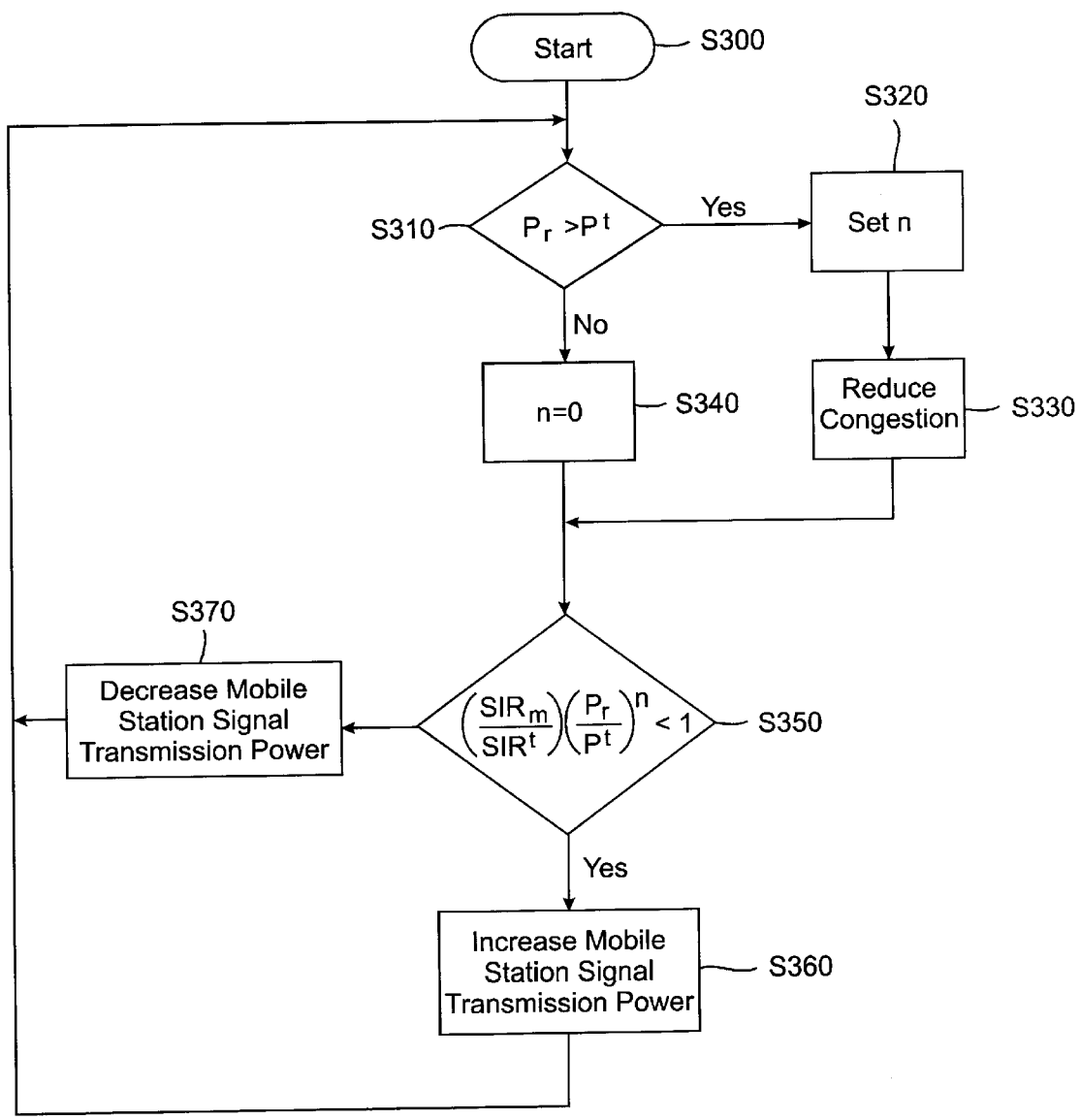
FIG. 3 is a flow diagram illustrating signal transmission power control and congestion control according to a first embodiment of the invention.

FIG. 3 is a flow diagram showing a method for controlling congestion and transmission signal power according to a first embodiment of the invention. The method begins at step S300, and proceeds to step S310. In step S310, a determination is made whether $P_r$ is greater than $P^t$. If $P_r$ is greater than $P^t$, then n is set equal to 0.25 in step S320, and the method moves from step S320 to step S330. In step S330, congestion is reduced. From step S330, the method moves to step S350 where a determination is made whether a condition such as:

$$(SIR_m/SIR^t)*((P_r/P^t)^n)<1$$

is satisfied. If the condition is not satisfied, then the method moves from step S350 to step S370, where the mobile station signal transmission power is decreased. From step S370 the method moves back to step S310, and the process repeats. If the condition is satisfied, then the method moves from step S350 to step S360, where mobile station signal transmission power is increased. From step S360 the method moves to step S310. If at step S310 $P_r$ is determined to be less than $P^t$, then the method moves from step S310 to step S340, where n is set equal to zero. From step S340 the method moves to step S350, and proceeds as described above.

Figure 4:
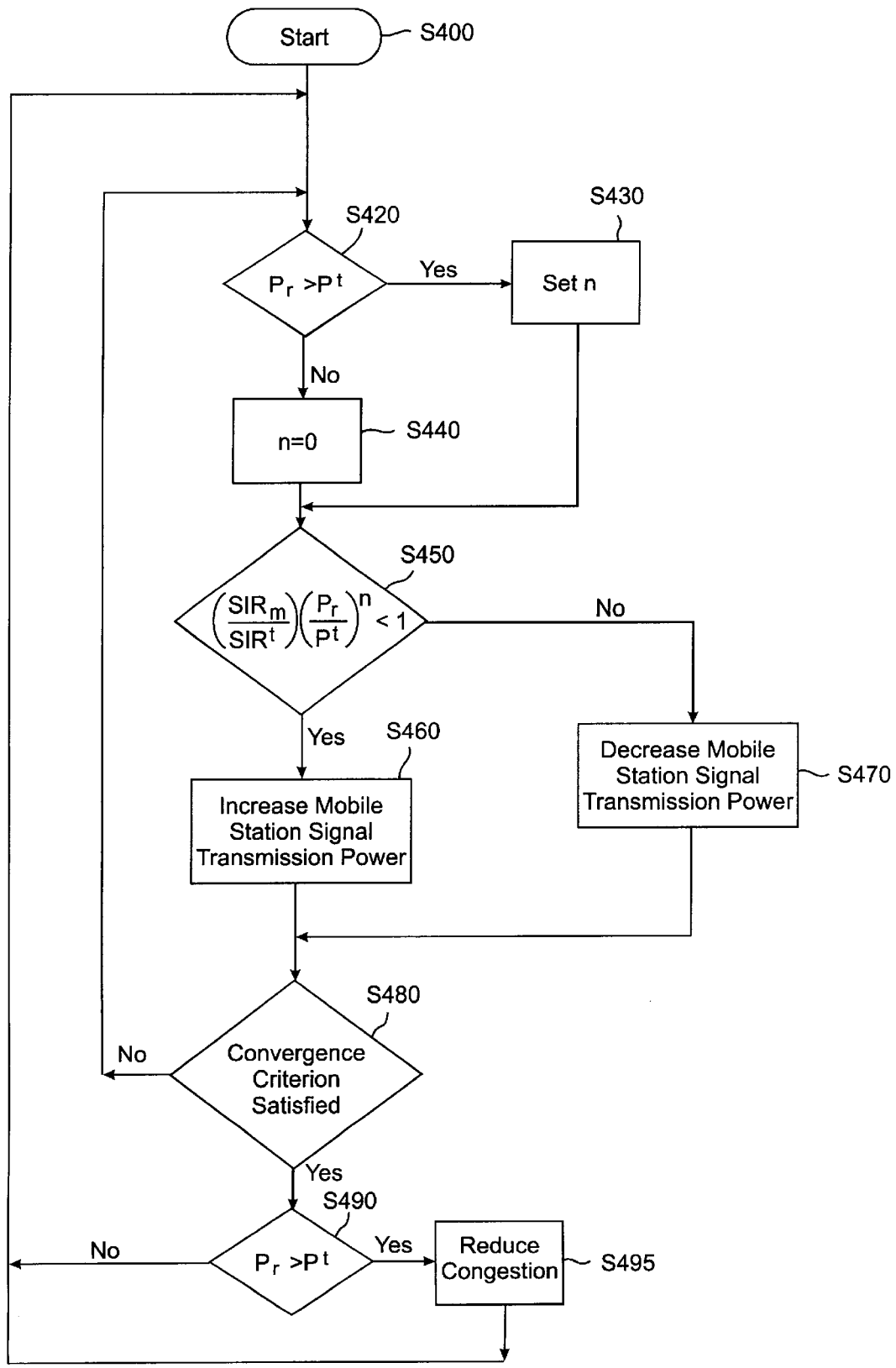
FIG. 4 is a flow diagram illustrating signal transmission power control and congestion control according to a second embodiment of the invention.

FIG. 4 is a flow diagram showing a method for controlling congestion and transmission signal power according to a second embodiment of the invention. The method begins at step S400 and proceeds to step S420, where a determination is made whether $P_r$ is greater than $P^t$. If yes, then n is set equal to 0.25 in step S430. If no, then n is set equal to zero in step S440. From each of steps S430 and S440 the method moves to step S450. In step S450, a determination is made whether a condition such as:

$$(SIR_m/SIR^t)*((P_r/P^t)^n)<1$$

is satisfied. If the condition is satisfied, then the method proceeds to step S460 where mobile station signal transmission power is increased. From step S460 the method moves to step S480. If the condition is not satisfied in step S450, then the method moves to step S470, where the mobile station signal transmission power is decreased. From step S470, the method moves to step S480, where a determination is made whether a convergence criterion is satisfied. If the convergence criterion is not satisfied, then the method moves from step S480 to step S420 and the cycle repeats. The convergence criterion is a measure of how rapidly the total power received at the base station, $P_r$, is changing during a time $\Delta t$. For example, the convergence criterion can be:

$$|P_r(t)-P_r(t-\Delta t)|<\epsilon$$

where $P_r(t)$ is the total power received at the base station at a time t, and $\epsilon$ is a chosen value or threshold. If in step S480 the convergence criterion is satisfied, then the method moves from step S480 to step S490, where a determination is made whether $P_r$ is greater than $P^t$. If $P_r$ is greater than $P^t$, then the method moves to step S495, where congestion is reduced. From step S495, the method moves to back to step S420, and the process repeats. If in step S490 $P_r$ is determined to be less than $P^t$, then the method moves directly back to step S420.

It will be understood that Applicant's invention is not limited to the particular embodiments described above and that modifications may be made by persons skilled in the art. The scope of Applicant's invention is determined by the following claims, and any and all modifications that fall within that scope are intended to be included therein.

What is claimed is:

1. A method of controlling a communication system having base stations and mobile stations, comprising the steps of:

controlling signal transmission power of at least one mobile station in the system based on a signal traffic congestion in the system, wherein the step of controlling signal transmission power comprises:
measuring a quality of a signal transmitted from one of the mobile stations to one of the base stations;
comparing the measured signal quality with a first threshold value $SIR^t$;
measuring a received signal power $P_r$ at the one base station;
comparing the measured signal power $P_r$ with a second threshold value $P^t$; and
changing the signal transmission power of the one mobile station based on the comparisons of the measured signal quality with the first threshold value $SIR^t$ and the measured signal power with the second threshold value $P_r$; wherein the signal transmission power of the one mobile station is increased when a) $(SIR_m/SIR^t)<1$ and $P_r<P^t$, or b) $(SIR_m/SIR^t)((P_r/P^t))<1$ and $P_r>P^t$, where $SIR_m$ is a signal to interference ratio measured at the one base station of a signal transmitted from the one mobile station;

$SIR^t$ is a predetermined signal to interference ratio threshold value;

$P_r$ is a total signal power received at the one base station;

$P^t$ is a predetermined total received signal power threshold value; and n is greater than zero; and controlling the sign traffic congestion in the system based on the comparison of the measured signal power with the second threshold value $P^t$, wherein the step of controlling congestion is performed when $P_r>P^t$ and comprises the steps of:

selecting a signal transmission between a first mobile station and a first base station;

performing at least one of lowering a bit rate of the selected signal transmission, executing an interfrequency handover of the selected signal transmission, and terminating the selected signal mission; and repeating the steps of selecting and performing until $P_r<P^t$.

2. The method of claim 1, wherein n is greater than or to 0.2 and less than or equal to 0.3.

3. The method of claim 1, wherein the signal transmission is selected based on whether delivery of data via the signal transmission is desired in real time.

4. The method of claim 1, wherein the step of performing is prioritized such that lowering the bit rate of the signal transmission and executing an interfrequency handover are preferred over terminating the selected signal transmission.

5. The method of claim 1, wherein the step of performing is prioritized such that lowering the bit rate of the signal transmission is preferred over executing an interfrequency handover.

6. An apparatus for stabilizing a communication system having base stations and mobile stations, comprising:

means for stabilizing a power vector of the system based on signal traffic congestion in the system, including means for measuring a total signal power pr received at one of the base stations;

means for comparing the measured signal power $P_r$ with a first threshold value $P^t$;

means for measuring a quality $SIR_m$ of a signal transmitted from one of the mobile stations to the one base station;

means for comparing the measured quality $SIR_m$ with a second threshold value $SIR^t$; and means for changing the signal transmission power of the one mobile station based on the comparisons of the measured values with the threshold values, by increasing the signal transmission power of the one mobile station when a) $(SIR_m/SIR^t)<1$ and $P_r<P^t$, or b) $(SIR_m/SIR^t)((P_r/P^t)^n)<1$ and $P_r>P^t$, where $SIR_m$ is a signal to interference ratio measured at the one base station of a signal transmitted from the one mobile station;

$SIR^t$ is a predetermined signal to interference ratio threshold value;

$P_r$ is a total signal power received at the one base station;

$P^t$ is a predetermined total received signal power threshold value; and n is greater than zero; and means for reducing congestion in the system from a first level to a second level when $P_r>P^t$, by selecting a signal transmission between a first mobile station and a first base station and performing at least one of a) lowering a bit rate of the selected signal transmission, b) performing an interfrequency handover of the selected signal transmission, and c) terminating the selected signal transmission, until $P_r<P^t$.

7. The apparatus of claim 6, wherein the means for stabilizing comprises a processor located at one of the base stations.

8. The apparatus of claim 6, wherein the means for reducing congestion comprises a processor located at one of the stations.

* * * * *

UNITED STATES PATENT AND TRADEMARK OFFICE
CERTIFICATE OF CORRECTION

PATENT NO. : 6,128,506
DATED : October 3, 2000
INVENTOR(S) : Jens KNUTSSON, et al.

It is certified that error appears in the above-identified patent and that said Letters Patent is hereby corrected as shown below:

Make the following changes:

At column 5, line 12, change "Pt" to --$P^t$--.

At column 5, line 34, change "Pr" to --$P_r$--.

In claim 1, at line 23, change "$(SIR_m/SIR^t)(P_r/P^t))<1$" to --$(SIR_m/SIR^t)((P_r/P^t)^n)<1$--.

In claim 6, at line 5, change "pr" to --$P_r$--.

Signed and Sealed this

Eighth Day of May, 2001

Attest:

NICHOLAS P. GODICI

*Attesting Officer*   Acting Director of the United States Patent and Trademark Office